United States Patent [19]
Kopas

[11] 3,801,068
[45] Apr. 2, 1974

[54] AUTOMATIC FOLDING LANDING GEAR

[75] Inventor: Peter P. Kopas, Nicktown, Pa.

[73] Assignee: Kogen Industries, Inc., Carrolltown, Pa.

[22] Filed: Dec. 22, 1972

[21] Appl. No.: 317,750

[52] U.S. Cl.............................. 254/86 R, 280/150.5
[51] Int. Cl. ............................................... B60s 9/02
[58] Field of Search....... 280/150.5; 254/86 R, 86 H

[56] References Cited
UNITED STATES PATENTS

| | | | |
|---|---|---|---|
| 1,988,304 | 1/1935 | Duman | 254/86 R |
| 2,358,488 | 9/1944 | Black | 254/86 R |
| 2,837,312 | 6/1958 | Troche | 254/86 H |
| 3,081,065 | 3/1963 | Dalton | 254/86 R |
| 3,182,957 | 5/1965 | Dalton | 254/86 R |
| 3,236,501 | 2/1966 | McKay | 280/150.5 X |
| 3,362,683 | 1/1968 | Hansen | 254/86 H |

*Primary Examiner*—Leo Friaglia
*Attorney, Agent, or Firm*—Berman, Bishoff & Platt

[57] ABSTRACT

A folding landing leg assembly for a tractor trailer or the like. The assembly has a main leg pivoted on a bracket with a telescoping foot-carrying portion having a traveling nut engaged by a screw journalled axially in the main leg. The screw is driven by a hand crank through a crankshaft coaxial with the main leg pivot axis and gearing. The main leg is also connected to the bracket by a pair of link arms, the lower link arm being secured to a transverse shaft journalled in the main leg. A cam on this shaft is engagable by a transverse pin on the foot-carrying portion to automatically fold the leg assembly when the foot-carrying portion is elevated by operating the hand crank.

12 Claims, 5 Drawing Figures

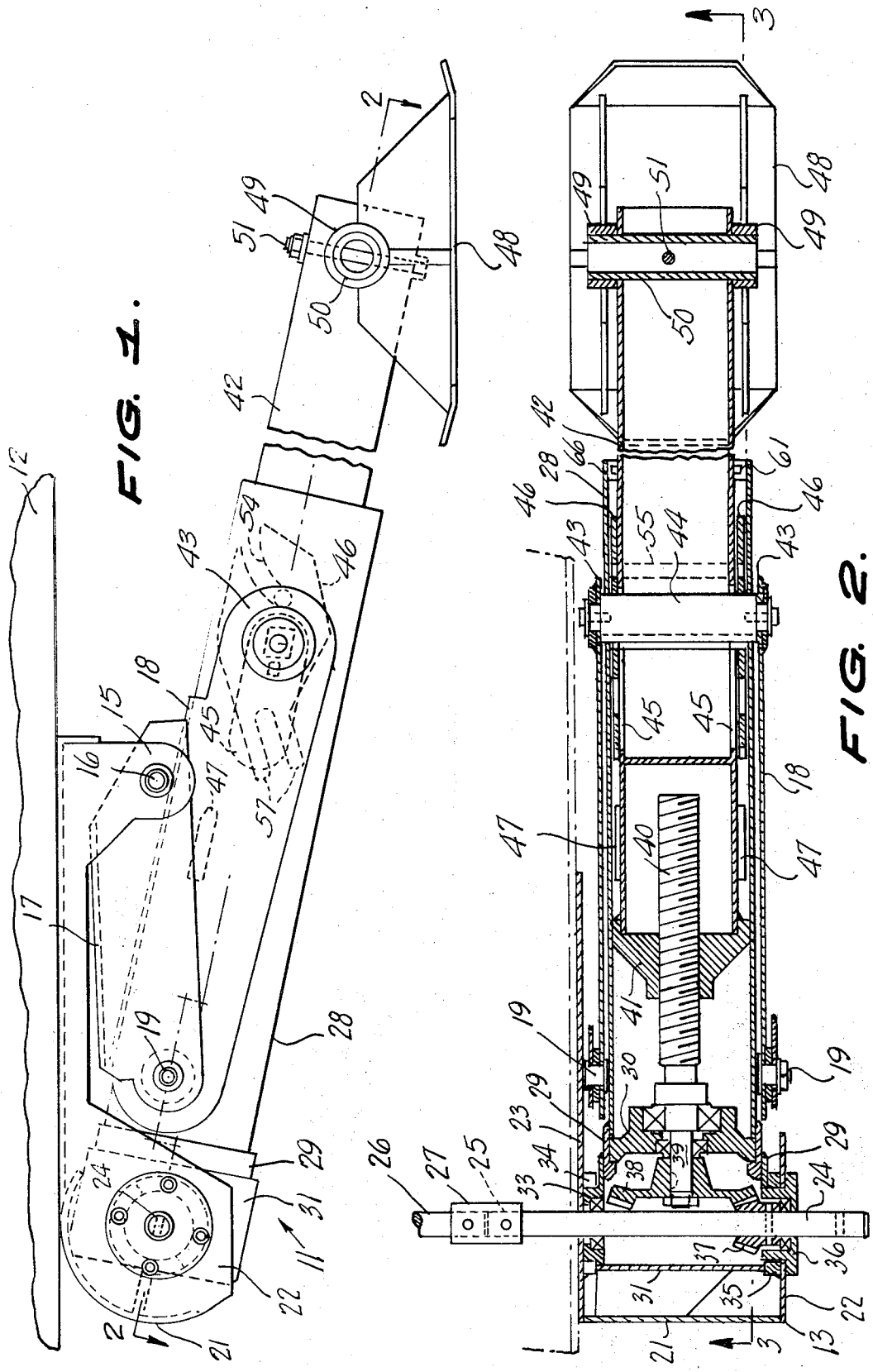

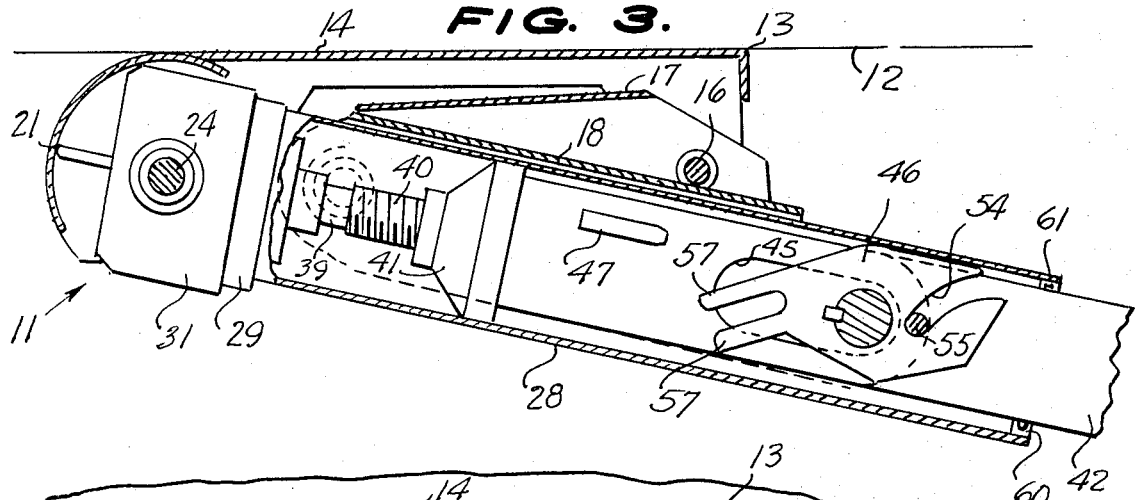
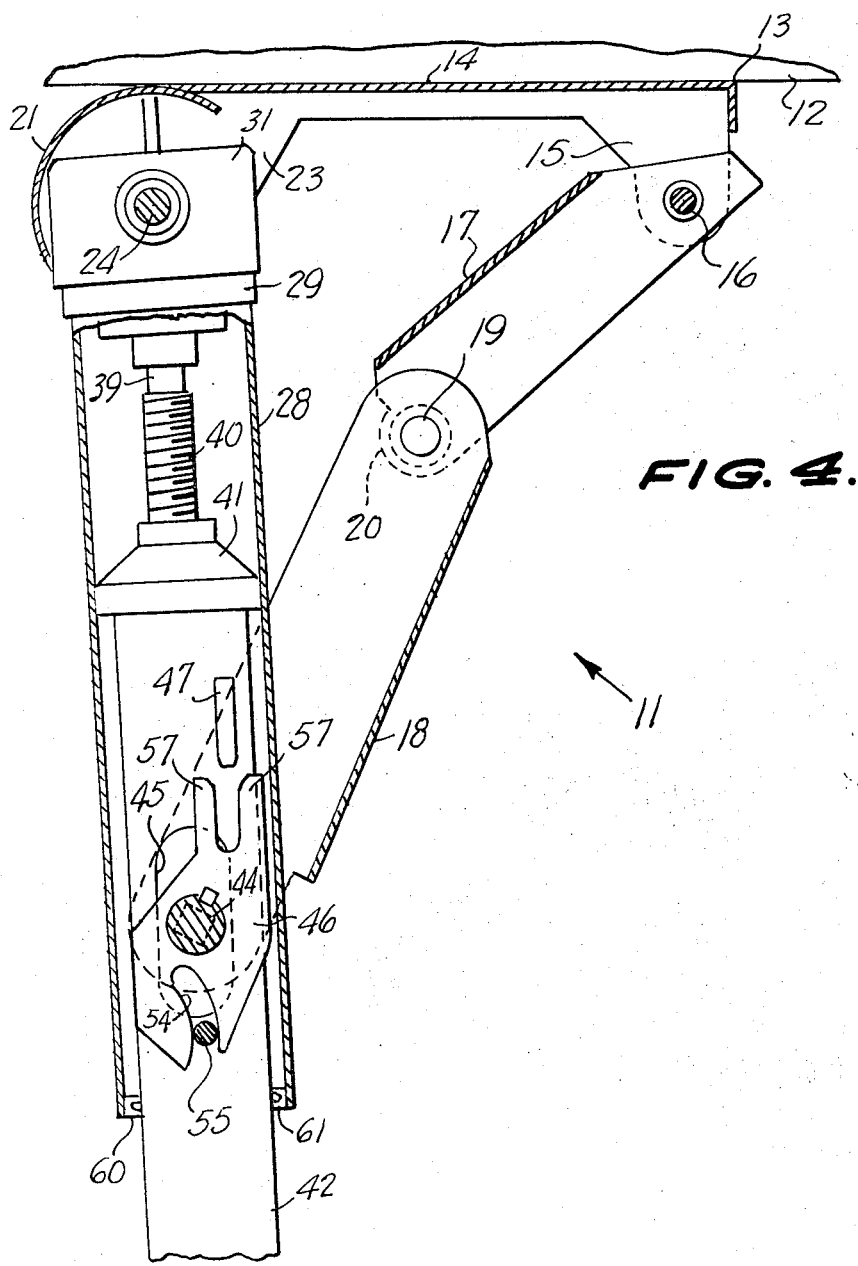

AUTOMATIC FOLDING LANDING GEAR

This invention relates to landing leg assemblies for tractor-trailers or the like, and more particularly to a landing leg assembly of the folding type.

A main object of the invention is to provide a novel and improved foldable landing leg assembly for a tractor-trailer or similar vehicle, the landing leg assembly being simple in construction, involving relatively few parts, and being operated by the rotation of a crank element continuously in a single direction for raising the assembly from its operating to its folded position, and continuously in the opposite direction for lowering and extending the leg assembly.

A further object of the invention is to provide an improved folding landing leg assembly for a tractor-trailer or similar vehicle, the assembly involving relatively inexpensive components, being reliable in operation, being self-locking when lowered to its operative position, and requiring a relatively small amount of torque for operating the assembly.

A still further object of the invention is to provide an improved folding landing leg assembly for a tractor-trailer or similar vehicle, the assembly being rugged in construction, being foldable to a very compact size when not in use, being retractable to a substantially non-obstructing position beneath the body of the associated vehicle, and being operable to quickly lower and extend its supporting foot portion to its operating vertical position when required so as to safely support the associated vehicle while it is being detached from its tractor or other prime mover.

A still further object of the invention is to provide an improved folding landing leg assembly for a tractor-trailer or similar vehicle, the assembly being compact in size, being self-contained with most of its working parts housed therein and protected against damage, and being operative in a relatively simple manner by means of an ordinary hand crank rod or similar conventional implement.

Further objects and advantages of the invention will become apparent from the following description and claims, and from the accompanying drawings, wherein:

FIG. 1 is a side elevational view of an improved folding landing leg assembly constructed in accordance with the present invention, shown attached to the bottom of a trailer.

FIG. 2 is a longitudinal cross-sectional view taken substantially on line 2—2 of FIG. 1.

FIG. 3 is a fragmentary cross-sectional view taken substantially on line 3—3 of FIG. 2, with part of the foot-carrying portion of the assembly broken away.

FIG. 4 is a cross-sectional view similar to FIG. 3, but showing the assembly in an intermediate unfolded position.

Figure 5:
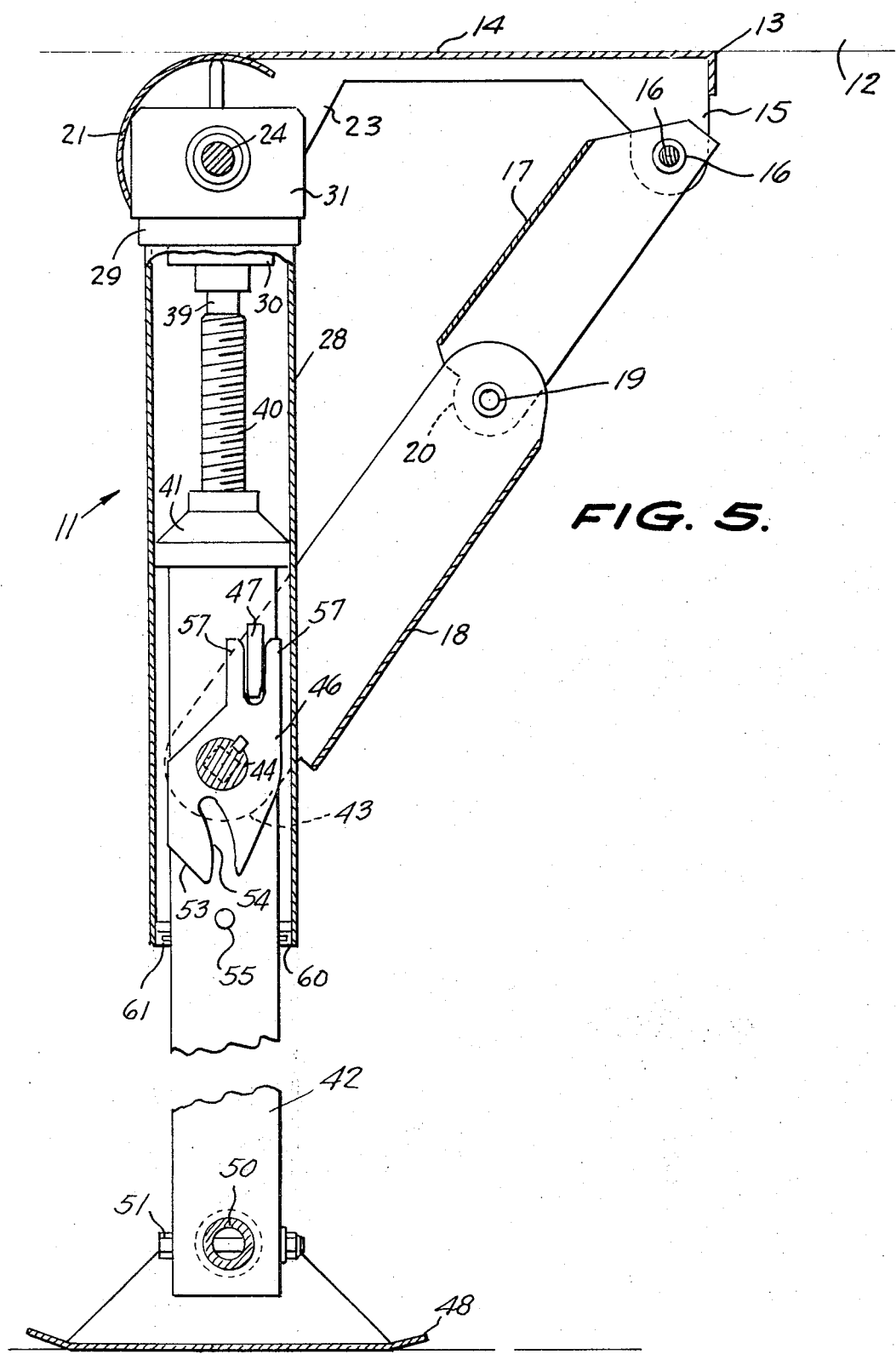
FIG. 5 is a veritcal cross-sectional view, generally similar to FIGS. 3 and 4, but showing the assembly in its final unfolded, extended operative position.

Referring to the drawings, 11 generally designates an improved folding landing leg assembly for a tractor-trailer, such as a trailer vehicle 12, a fragment of the bottom portion of the vehicle being shown in FIG. 1. The assembly 11 is provided with a downwardly facing, generally box-shaped attachment bracket 13 having a plate-like main body portion 14 adapted to be secured to the bottom of the vehicle 12 in any suitable manner.

The bracket 13 is provided at its right end, as viewed in FIG. 1, with depending spaced lugs 15, 15 between which extends a transverse link-supporting shaft or pin 16. Pivotally connected to the lug 15, 15 on the pin 16 is a channel-shaped link arm 17. A second channel-shaped link arm 18 is pivotally connected by coaxial headed pivot pins 19, 19 between spaced lugs 20, 20 formed on the ends of the side walls of the channel-shaped first link arm 17.

As shown in FIG. 1, the link arm 18 is rotatable relative to the link arm 17 so as to be at least partially nestingly receivable in link arm 17 when the assembly is in its folded position, with the top wall of the channel-shaped link arm 18 substantially in abutment with the pivot pin 16, as viewed in FIG. 1.

The left-end portion of the bracket 14 is formed with a downwardly facing housing having an arcuate end wall 21 and parallel side walls 22 and 23, said housing portion being provided with a transverse shaft 24 journalled therein, said shaft having a squared outer end portion 25 adapted to be engaged by a crank bar 26 having a square socket 27 shaped to interfit with said square portion 25 so as to provide a driving connection. Designated at 28 is a sleeve-like main leg member provided with a collar portion 29 in which is rigidly secured a bearing spider 30, said collar portion being further secured to an end housing 31 which is journalled between the bracket walls 22, 23 coaxially with the shaft 24, the housing portion 31 having an annular bearing portion 33 at one side rotatably received in a socket ring 34 secured to the depending bracket wall 23, and having a bearing ring 35 at its other side engaging on the inwardly projecting portion of a bearing bushing 36 secured in the opposite depending bracket wall 22, as shown in FIG. 2. The shaft 24 is journalled on suitable bearings provided therefor respectively in the annular bearing portion 33 and the bushing member 36.

Secured on the shaft 24 adjacent the bushing member 36 is a pinion gear 37 which meshes with a beveled gear 38 secured on the end of a screw shaft 39 journalled in the bearing spider member 30. The screw shaft 39 is integral with the threaded driving screw portion 40 which threadedly engages a traveling nut member 41 rigidly secured on the end of a foot-carrying tubular member 42 which is movably received in the sleeve-like main leg 28.

As shown in FIG. 2, the tubular main leg 28 is at times receivable between the pivot pin elements 19, 19 connecting the link arms 17, 18.

The link arm 18 is provided at its end opposite the connecting rivets 19, 19 with parallel lugs 43, 43 between which is rigidly connected a transversely extending shaft member 44 which extends rotatably through the main leg member 28 and through longitudinal slots 45, 45 formed in the foot-carrying portion 42. A pair of cam members 46, 46 are rigidly secured on the shaft member 44 and are interposed between the tubular foot-carrying portion 42 and the surrounding tubular main leg portion 28. These tubular members are of substantially rectangular cross-section so that clearance is provided therebetween to allow the cam members 46, 46 to rotate with the shaft member 44 in a manner presently to be described.

Opposite longitudinally extending locking ribs 47, 47 are secured on the inner end portion of the foot-carrying member 42, these ribs being lockingly interengagable with the cam members 46, 46 when the foot-carrying portion is in its fully extended position, as will be presently described.

A ground-engaging foot member 48 is pivotally connected to the free end of the foot-carrying portion 42, being provided with circular pivot rings 49, 49 rotatably supported on the ends of a transverse pivot tube 50 secured in the free end portion of the member 42, for example, by a central transverse fastening bolt 41.

As will be apparent from FIGS. 1 and 5, the foot member 48 is pivoted to swing freely by gravity and will automatically maintain its bottom ground-engaging portion in a substantially horizontal position at all times.

As above-mentioned, the cam members 46 are rigidly connected to the lower link arm 18 and will rotate relative to the foot-carrying portion 42 and the main leg 28 in accordance with the rotation of the link arm 18 with respect to these members. Sufficient clearance is provided within the main leg 28 to allow such rotation of the cam elements 46.

Each cam element 46 is provided with a downwardly convergent bottom portion 53, as viewed in FIGS. 4 and 5, formed with an upwardly and laterally curved slot 54 adapted to at times receive therein an outwardly projecting end portion of a transverse pin 55 secured in the foot-carrying portion 42. Thus, the pin 55 cooperates with the arcuate slot 54 of the cam member 46 to at times cammingly couple foot-carrying portion 42 with the lower link arm 18. The shape of the slots 54 is such as to cause the angle between link arm 18 and foot-carrying portion 42 to decrease as the pin elements 55 move upwardly into and engage the arcuately curved cam slots 54, for example, from the position shown in FIG. 5 to the position shown in FIG. 4, and thereafter to the position shown in FIG. 3. This camming action is reversed when the foot-carrying portion 42 is extended relative to the main leg portion 28.

It will also be seen that the linkage provided between the foot-carrying portion 42, the cam members 46, the lower link arm 18 and the upper link arm 17 is such as to swing the main leg portion 28 around the axis of the crankshaft 24 when the linkage is actuated. For example, when the foot-carrying portion 42 is elevated from the position of FIG. 5, so that the pin ends 55 engage in the cam slots 54, as above-described, the continued elevation of the pin end elements 55 will fold the linkage through the position of FIG. 4 and ultimately fold the linkage to the position shown in FIG. 3. Thus, as this occurs, the main leg portion 28 is swung in a counterclockwise direction, as viewed in FIG. 5, and ultimately reaches the elevated position shown in FIG. 3 as the ends of pin 55 reach the inner ends of the cam slots 54.

The top portions of the cam members 46, as viewed in FIGS. 4 and 5, are formed with laterally offset pairs of spaced parallel fingers 57, 57 adapted to receive the locking ribs 47 therebetween when the foot-carrying member 42 is in its fully lowered position, as shown in FIG. 5. This locks the linkage defined between members 28, 18 and 17, and thus, secures the foot-carrying portion 42 in its operating vertical position. As shown in FIG. 5, in the locked position of the linkage the link arms 18 and 17 are substantially in alignment and the axes of the shaft element 44, the pin members 19 and the transverse shaft element 16 are substantially located in the same plane.

In operation, assuming the landing leg assembly to be in the folded position shown in FIG. 3, the operator engages the crank socket 27 with the squared end 25 of shaft 24 and rotates the crank in a direction to cause the screw 44 to move the traveling nut element 41 rightwardly, as viewed in FIG. 2. This likewise moves the foot-carrying portion 42 rightwardly and causes the ends of the pin 55 to move rightwardly along the curved cam slots 54, thereby causing the cam members 46 to rotate in a clockwise direction from the position shown in FIG. 3. As the foot-carrying portion 42 continues to be extended rightwardly, the rotation of the cam members 46 produces corresponding rotation of the link arm 18 accompanied by clockwise rotation of the main leg portion 28, namely, from the positions shown in FIG. 3 toward the positions shown in FIG. 4, the upper link arm 17 swinging counterclockwise to follow the clockwise rotation of the lower link arm 18. As the foot-carrying portion 42 is further extended, the slots defined between the pairs of fingers 57, 57 become vertical and the ribs 47 descend into said slots, finally reaching the position shown in FIG. 5.

This completes the unfolding of the landing leg assembly and places the landing leg assembly in load-supporting position to support the weight of the associated trailer or other vehicle. It will be noted that the unfolding of the leg assembly is accomplished by the continuous rotation of the crankshaft 24 in one direction by means of the crank handle rod 26, it being necessary merely to rotate the driving handle 26 until further rotation is prevented by the final engagement of the locking ribs 47 between the pairs of cam fingers 57, 57, which prevents further extension of the foot-supporting member 42 with respect to the main leg 28.

To fold up the landing leg assembly, namely, to retract the leg portion 42 and restore the parts to the folded positions thereof shown in FIG. 1, it is merely necessary to reverse the direction of rotation of the shaft 24, namely, to reverse the direction of rotation of the driving handle rod 26. Under these conditions, the screw 40 moves the traveling nut 41 leftwardly, as viewed in FIG. 2, and moves the supporting leg portion 42 upwardly from the position of FIG. 5, so that the ends of the pin 55 enter the cam slot 54 and cammingly coact therewith in the manner previously described to fold up the linkage, the locking ribs 47 being elevated above the pairs of locking fingers 57, 57 to allow rotation of the cam members 46 relative to members 28 and 42, for example, from the positions shown in FIG. 5 toward the positions shown in FIG. 3. The folding up of the linkage causes the main leg 28 to be nestingly received within the channel-shaped lower link bar 18 and causes the lower channel-shaped link bar 18 to be partially nestingly received in the upper link arm 17, the folding action continuing until the top wall of the lower link arm 18 comes into abutment with the transverse pivot pin 16, as above-described. Thus, in the folded position of the assembly, the upper link arm 17 is received in a substantially horizontal position in the downwardly facing generally channel-shaped bracket member 14 with the other arm 18 closely subjacent thereto and with the main leg 28 nestingly received in said other link arm 18.

The arcuate configuration of the end wall 21 of bracket member 14 allows clearance for the end housing portion 31 as it rotates with main leg member 28, for example, from the position shown in FIG. 5 toward the position shown in FIG. 1.

As above-mentioned, the freely pivoted foot member 48 remains substantially horizontal as it is elevated from the position shown in FIG. 5 to the position shown in FIG. 1 and, conversely, when it is lowered from the position in FIG. 1 toward the operating position of FIG. 5.

The traveling nut member 41 slidably engages inside the hollow main leg 28, and the foot-supporting portion 42 is slidably and sealingly engaged by a suitable sealing and bearing member 60 which is secured in the free end portion of the main leg member 28, the member 60 being of suitable wear-resisting material and being formed with an inwardly facing groove containing suitable sealing material, such as rubber, or the like, shown at 61. The members 60 and 61 thus provide bearing support for the extensible and retractable foot-supporting member 42 but also provide a seal against the entry of moisture, thereby minimizing rusting or corrosion of the moving parts contained within the hollow main leg portion 28.

It will be seen that a single gear train, comprising pinion gear 37 and beveled gear 38, is employed to provide the two phases of operation of the assembly, namely, the vertical movement of the foot-carrying member 42, and the swinging movement of the main leg 28 caused by the camming interengagement of the ends of pin 55 with the cam slots 54. These two phases may occur at two respective speeds, and only the single gear set is required to obtain the two speeds, namely, the speed for vertically raising and lowering the landing leg and the speed for the action obtained when the cooperating camming elements are engaged to rapidly retract or lower the leg from folded position to use position and back.

While a specific embodiment of an improved folding landing leg assembly for a tractor-trailer or similar vehcle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle, a folding landing leg assembly comprising a tubular main leg member pivoted to the vehicle for swinging movement from an elevated position to a substantially vertical position, a foot-carrying member telescopically received in said main leg member, a nut member secured on said foot-carrying member, a screw member longitudinally journalled in said main leg member and threadedly engaging said nut member, means to rotate said screw member, whereby to move said foot-carrying member longitudinally in said main leg member, linkage means connecting the main leg member to the vehicle, and cooperating pin and cam means on the foot-carrying member and the linkage means to drivingly operate said linkage means so as to swing said main leg member responsive to longitudinal movement of the foot-carrying member in the main leg member.

2. The folding landing assembly of claim 1, and wherein the means to rotate said screw member comprises a transverse drive shaft journalled in the main leg member, and means drivingly coupling said drive shaft to the screw member.

3. The folding landing leg assembly of claim 2, and wherein said coupling means comprises a gear train between said drive shaft and said screw member.

4. The folding landing leg assembly of claim 2, and wherein the transverse drive shaft is coaxial with the pivotal connection of the main leg member to the vehicle.

5. The folding landing leg assembly of claim 4, and wherein said coupling means comprises a pinion gear on the drive shaft and a beveled gear on the screw member meshingly engaged with said pinion gear.

6. The folding landing leg assembly of claim 1, and wherein said linkage means comprises an upper link arm pivotally connected to the vehicle and a lower link arm connecting the main leg member to the upper link arm.

7. The folding landing leg assembly of claim 6, and wherein said pin and cam means comprises a pin element on the foot-carrying member and a cam in the main leg member rigidly connected to the lower link arm and having a cam slot in which the pin element is engagable, the slot being shaped to rotate the lower link arm relative to the main leg member responsive to the engagement of the pin element therewith.

8. The folding landing leg assembly of claim 7, and wherein the connection of the lower link arm to the main leg member comprises a transverse shaft element rigidly connected to the lower link arm and journalled transversely in the main leg member, said cam being rigidly secured on said transverse shaft element.

9. The folding landing leg assembly of claim 8, and wherein the top end of the cam is formed with a locking slot and the foot-carrying member is provided with an abutment element engagable in said locking slot when the foot-carrying member is extended downwardly after being rotated to a substantially vertical position with the main leg member.

10. The folding landing leg assembly of claim 9, and wherein the link arms are substantially channel-shaped, the lower link arm being nestingly receivable in the upper link arm and the main leg member being nestingly receivable in the lower link arm when the main leg member is in its uppermost elevated position.

11. The folding landing leg assembly of claim 1, and wherein said foot-carrying member is at times telescopically movable relative to said main leg member without interengagement of said pin and cam means.

12. The folding landing leg assembly of claim 11, and wherein the telescopic movement of the foot-carrying member without interengagement of said pin and cam means occurs when said main leg member is in said substantially vertical position.

* * * * *